United States Patent
Yoon

(10) Patent No.: US 10,431,221 B2
(45) Date of Patent: Oct. 1, 2019

(54) APPARATUS FOR SELECTING AT LEAST ONE TASK BASED ON VOICE COMMAND, VEHICLE INCLUDING THE SAME, AND METHOD THEREOF

(71) Applicants: Hyundai Motor Company, Seoul (KR); Kia Motors Corporation, Seoul (KR)

(72) Inventor: Hyunjin Yoon, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 64 days.

(21) Appl. No.: 15/823,373

(22) Filed: Nov. 27, 2017

(65) Prior Publication Data

US 2018/0358013 A1   Dec. 13, 2018

(30) Foreign Application Priority Data

Jun. 13, 2017 (KR) .................. 10-2017-0073813

(51) Int. Cl.
  *G10L 21/00* (2013.01)
  *G10L 15/22* (2006.01)
  (Continued)

(52) U.S. Cl.
  CPC .......... *G10L 15/22* (2013.01); *B60R 16/0373* (2013.01); *G06F 3/167* (2013.01); *G10L 15/1822* (2013.01); *G10L 15/265* (2013.01); *G10L 15/32* (2013.01); *G10L 17/00* (2013.01); *G10L 2015/223* (2013.01)

(58) Field of Classification Search
  CPC ............ B60R 16/0373; B60R 11/0247; G07C 9/00571; G10L 15/22; G10L 17/26; G10L 15/30; G10L 15/193; G10L 2015/228; G10L 13/00; G10L 15/20; G10L 15/32; G10L 2015/223; G10L 2021/02166; G10L 21/0272; G10L 21/028; G10L 25/78;
  (Continued)

(56) References Cited

U.S. PATENT DOCUMENTS

| 9,286,030 B2* | 3/2016 | Holdren | B60R 11/0247 |
| 2009/0055180 A1* | 2/2009 | Coon | B60R 16/0373 704/251 |
| 2015/0162006 A1* | 6/2015 | Kummer | G07C 9/00571 704/275 |

FOREIGN PATENT DOCUMENTS

| JP | 2016-143050 A | 8/2016 |
| JP | 2016-161754 A | 9/2016 |

(Continued)

*Primary Examiner* — Huyen X Vo
(74) *Attorney, Agent, or Firm* — Morgan, Lewis & Bockius LLP

(57) ABSTRACT

Disclosed are an apparatus for selecting at least one task based on a voice command, a vehicle including the same, and a method thereof, wherein the method for selecting a task based on a voice command may include receiving voices from a plurality of speakers, extracting at least one keyword related to a task from each of the voices of the plurality of speakers, determining at least one task corresponding to at least one keyword extracted from each of the voices of the plurality of speakers, determining a processing order of the at least one task on the basis of a predefined priority information and sequentially performing at least one task according to the determined processing order of the at least one task.

20 Claims, 16 Drawing Sheets

(51) Int. Cl.
    *G06F 3/16*         (2006.01)
    *G10L 15/26*       (2006.01)
    *G10L 15/32*       (2013.01)
    *B60R 16/037*     (2006.01)
    *G10L 15/18*       (2013.01)
    *G10L 17/00*       (2013.01)

(58) Field of Classification Search
    CPC ......... G10L 15/08; G10L 15/19; G10L 17/00;
                                                        G10L 2015/227
    USPC ........................ 704/1–10, 200–257, 270–277
    See application file for complete search history.

(56) References Cited

FOREIGN PATENT DOCUMENTS

| | | |
|---|---|---|
| JP | 2016-206469 A | 12/2016 |
| KR | 10-2016-0027728 A | 3/2016 |

\* cited by examiner

FIG. 3

| ID | POSITION | VOICE CHARACTERISTICS (FEATURES) | DRIVER OR NON-DRIVER |
|---|---|---|---|
| 0001 | FRONT LEFT | FDAG··· | (DRIVER) |
| 0002 | FRONT RIGHT | KDFD··· | |
| 0003 | REAR LEFT | LOKJ··· | |
| 0004 | REAR RIGHT | ACAD··· | |

FIG. 4

| ID | POSITION | VOICE CHARACTERISTICS (FEATURES) | DRIVER OR NON-DRIVER |
|---|---|---|---|
| 0001 | FRONT LEFT | KDGA··· | DRIVER |
| 0002 | FRONT RIGHT | FDAG··· | |
| 0003 | REAR LEFT | LOKJ··· | |
| 0004 | · | · | · |

FIG. 5

| ID | POSITION | VOICE CHARACTERISTICS (FEATURES) | DRIVER OR NON-DRIVER |
|---|---|---|---|
| 0001 | FRONT LEFT | KDGA··· | DRIVER |
| 0002 | FRONT RIGHT | FDAG··· | PREVIOUS DRIVER |
| 0003 | REAR LEFT | LOKJ··· | |
| 0004 | · | · | · |

FIG. 6

| KEYWORD | : SAFETY |
|---|---|
| TASK | PRIORITY |
| TIRE PRESSURE | 5 |
| GAS STATION | 4 |
| DESTINATION SEARCH | 3 |
| HOME | 2 |
| OFFICE | 3 |
| RADIO | 2 |
| CHANNEL SWITCHING | 2 |
| HEADLIGHTS | 4 |
| AIR-CONDITIONER | 3 |
| BRAKE | 6 |
| ⋮ | ⋮ |

| TASK | PRIORITY | DRIVER OR NON-DRIVER |
|---|---|---|
| GAS STATION SEARCH | 4 | PREVIOUS DRIVER |
| CHANNEL SWITCHING | 2 | NO |
| AIR-CONDITIONER | 2 | CURRENT DRIVER |

| TASK | PRIORITY | DRIVER OR NON-DRIVER |
|---|---|---|
| GAS STATION SEARCH | 4 | PREVIOUS DRIVER |
| CHANNEL SWITCHING | 2 | NO |
| AIR-CONDITIONER | 2 | CURRENT DRIVER |

89

89a

| TASK | PRIORITY | DRIVER OR NON-DRIVER |
|---|---|---|
| AIR-CONDITIONER | 2 | CURRENT DRIVER |
| GAS STATION SEARCH | 4 | PREVIOUS DRIVER |
| CHANNEL SWITCHING | 2 | NO |
| AIR-CONDITIONER | 2 | CURRENT DRIVER |

89b

APPARATUS FOR SELECTING AT LEAST ONE TASK BASED ON VOICE COMMAND, VEHICLE INCLUDING THE SAME, AND METHOD THEREOF

CROSS-REFERENCE(S) TO RELATED APPLICATIONS

The present application claims priority to Korean Patent Application No. 10-2017-0073813, filed on Jun. 13, 2017, the entire contents of which is incorporated herein for all purposes by this reference.

BACKGROUND OF THE INVENTION

Field of the Invention

The present invention are directed to providing an apparatus configured for selecting at least one task based on a voice command, a vehicle including the same, and a method thereof, and more particularly, the present invention relates to an apparatus configured for selecting at least one task based on a voice command to primarily perform at least one task based on the voice command, a vehicle including the same, and a method thereof.

Description of Related Art

A voice recognition apparatus is a device which recognizes a voice signal of a user and performs a predetermined operation(s) corresponding to the recognized voice signal. For example, the voice recognition apparatus may receive the voice signal, may recognize words and phrases from the received voice signal, and may generate data based on the recognition result. The generated data may be used by the voice recognition apparatus or other devices connected to the voice recognition apparatus.

A vehicle is a machine which travels on roads or tracks to carry people or objects to a destination. Vehicles may move in various directions according to a rotation of at least one wheel mounted to a vehicle body. Such vehicles may include, for example, a three-wheeled or four-wheeled vehicle, a two-wheeled vehicle including a motorcycle, a motorized bicycle, construction equipment, a bicycle, a train traveling on rails, and the like.

In recent times, voice recognition apparatuses have been disposed in vehicles. When a driver or occupant utters a voice command, the voice recognition apparatus may recognize the uttered voice command, and the vehicle may perform the various operations corresponding to the voice command recognized by the voice recognition apparatus. Accordingly, the driver or occupant may verbally input various commands to the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

In the present specification, the term "speaker (or speakers)" refers to an audible person.

Various aspects of the present invention are directed to providing an apparatus for selecting at least one task based on a voice command to primarily perform at least one task based on the voice command, a vehicle including the same, and a method thereof.

Additional aspects of the invention will be set forth in part in the description which follows and, in part, will be obvious from the description, or may be learned by practice of the invention.

A method for selecting a task based on a voice command may include receiving voices of a plurality of speakers, extracting at least one keyword related to a task from each of the voices of the plurality of speakers, determining at least one task corresponding to at least one keyword extracted from each of the voices of the plurality of speakers, determining a processing order of the at least one task on the basis of a predefined priority information and sequentially performing at least one task according to the determined processing order of the at least one task.

The method may further include extracting characteristic information from each of the voices of the plurality of occupant, and acquiring identification information regarding each occupant.

The method may further include analyzing a directivity of each of the voices of the plurality of speaker, and thus determining an utterance position of each speaker and determining a current driver on the basis of the utterance position of the speaker.

The determining the processing order of the at least one task on the basis of the predefined priority information may include determining the processing order of the at least one task such that a task corresponding to a keyword extracted from an utterance of the current driver is processed with a relatively high priority.

The method may further include generating an identification information to further include information regarding the current driver.

The method may further include comparing the identification information regarding each speaker with the identification information regarding a predetermined speaker, and determining whether the speaker is a previous driver.

The determining the processing order of the at least one task on the basis of the predefined priority information may include determining a processing order of the at least one task such that a task corresponding to a keyword extracted from an utterance of the previous driver is processed with a relatively high priority.

The determining the processing order of the at least one task on the basis of the predefined priority information may include sequentially arranging the at least one task on the basis of the predefined importance dedicated for the at least one task, and determining a processing order of the at least one task.

The method may further include changing a processing order of a task corresponding to a keyword extracted from the utterance of a current driver or a previous driver, from among the at least one task being sequentially disposed, to a higher processing order, wherein the resultant processing order of the at least one task is determined.

The extracting the at least one keyword related to the task from each of the voices of the plurality of speakers may include determining whether an operation initiation keyword is disposed in each of the voices of the plurality of speakers, selecting at least one speaker's voice which includes the operation initiation keyword from among the voices of the plurality of speakers and extracting at least one keyword related to a task from the selected voice of the at least one speaker.

The extracting the at least one keyword related to the task from each of the voices of the plurality of speakers may include extracting at least one keyword related to the task from each of the voices of the plurality of speakers on a basis of predefined importance for each of the at least one task.

A vehicle may include a sound receiver configured to receive voices of a plurality of speakers, a processor configured to analyze each of the voices of the plurality of speakers, extract at least one keyword related to an operation of a vehicle from each of the voices of the plurality of speakers, determine at least one task corresponding to at least one keyword extracted from each of the voices of the plurality of speakers, determine a processing order of the at least one task on the basis of the predefined priority information, and sequentially generate a control signal according to the determined processing order of the at least one task and a peripheral device configured to operate according to the control signal.

The processor may extract the characteristic information from each of the voices of the plurality of speakers, and thus acquires the identification information regarding each speaker.

The processor may analyze the directivity of each of the voices of the plurality of speakers to determine the utterance position of each speaker, and determines the current driver on the basis of the utterance position of the speaker.

The processor may determine the processing order of the at least one task such that a task corresponding to a keyword extracted from the utterance of the current driver is processed with a relatively high priority, wherein the processing order of the at least one task is determined on the basis of the predefined priority.

The processor may compare the identification information regarding the speaker with the identification information regarding a pre-stored speaker and determine whether the speaker is a previous driver.

The processor may determine a processing order of the at least one task such that a task corresponding to a keyword extracted from an utterance of the previous driver is processed with a relatively high priority, wherein the processing order of the at least one task is determined on the basis of the predefined priority.

The processor may sequentially arrange the at least one task on the basis of the predefined importance dedicated for the at least one task, and determine a processing order of the at least one task.

The processor may change the processing order of a task corresponding to a keyword extracted from the utterance of a current driver or a previous driver, from among the at least one task being sequentially disposed, to a higher processing order, wherein the resultant processing order of the at least one task is determined.

The processor may determine whether an operation initiation keyword is disposed in each of the voices of the plurality of speakers, select at least one speaker's voice which includes the operation initiation keyword from among the voices of the plurality of speakers, and extract at least one keyword related to a task from the selected voice of the at least one speaker.

The processor may analyze each of the voices of the plurality of speakers on the basis of an importance predefined for each of the at least one task.

An apparatus for selecting a task based on a voice command may include a sound receiver configured to receive voices of a plurality of speakers and a processor configured to analyze each of the voices of the plurality of speakers, extract at least one keyword related to an operation of a vehicle from each of the voices of the plurality of speakers, determine at least one task corresponding to at least one keyword extracted from each of the voices of the plurality of speakers, and determine a processing order of the at least one task on the basis of a predefined priority information.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a diagram illustrating various exemplary embodiments of a characteristic table;

FIG. 4 is a diagram illustrating various exemplary embodiments of the characteristic table;

FIG. 5 is a second diagram illustrating various exemplary embodiments of the characteristic table;

FIG. 6 illustrates an exemplary embodiment of a task database (DB);

FIG. 7 is a table illustrating a decision result of at least one task according to an exemplary embodiment of the present invention;

Figure 1:
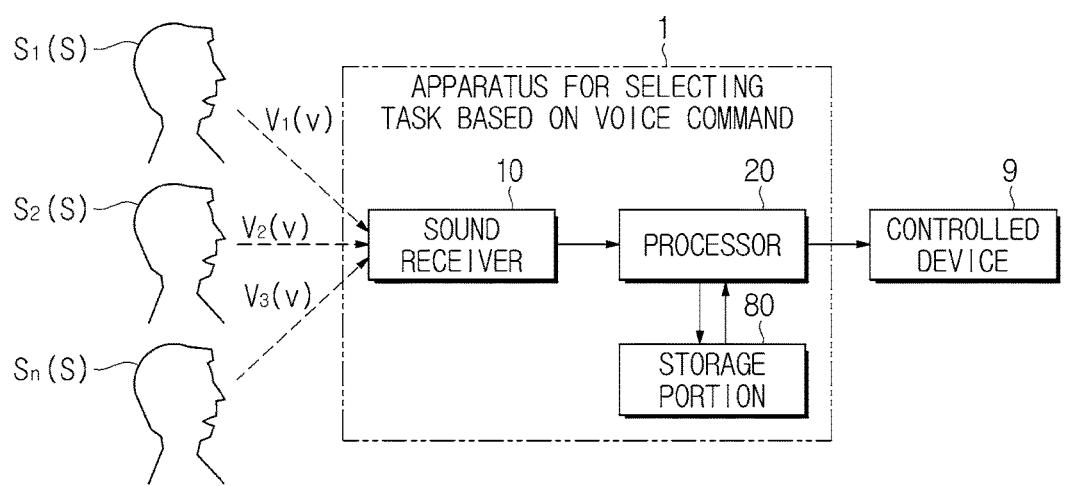
FIG. 1 is a conceptual diagram illustrating an apparatus for selecting a task based on a voice command according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An apparatus for selecting a task based on a voice command will hereinafter be described with reference to FIG. 1, FIG. 2, FIG. 3, FIG. 4, FIG. 5, FIG. 6, FIG. 7, FIG. 8, and FIG. 9.

FIG. 1 is a conceptual diagram illustrating an apparatus for selecting a task based on a voice command.

Referring to FIG. 1, the apparatus for selecting a task based on a voice command according to an exemplary embodiment of the present invention may include a sound receiver 10 configured for receiving sound waves from an external member, and outputting an electrical signal corresponding to the received sound waves, a processor 20 configured for performing various processes based on the electrical signal generated from the sound receiver 10; and a storage portion 80 configured for temporarily or non-temporarily storing various information therein.

The sound receiver 10 may receive a voice (v) uttered by at least one speaker (S), may convert the received voice (v) into an electrical signal (hereinafter referred to as a voice signal), and may output the resultant voice signal. The output voice signal may be directly transmitted to the processor 20 through conductive lines or circuits, or may be stored in the storage portion 80 and then transmitted to the processor 20. When the voice signal is stored in the storage portion 80, the processor 20 may retrieve the voice signal stored in the storage portion 80 for a predetermined time period, and may perform a sound processing of the retrieved voice signal.

For example, the sound receiver 10 may be implemented using a microphone. The microphone may include a diaphragm, and the diaphragm may vibrate according to the received sound waves and thus convert sound energy into electrical energy.

In accordance with an exemplary embodiment, the microphone may include a dynamic microphone or a condenser microphone. In addition, the microphone may include at least one of an omnidirectional microphone, a bidirectional microphone, and a unidirectional microphone.

The sound receiver 10 may receive voices ($V_1, V_2, \ldots, V_n$) uttered by a plurality of speakers ($S_1, S_2, \ldots, S_n$). In the present case, the sound receiver 10 may output an electrical signal in which the voices ($V_1, V_2, \ldots, V_n$) of the plurality of speakers ($S_1, S_2, \ldots, S_n$) are mixed, wherein the resultant electrical signal is transmitted to the processor 20.

In accordance with an exemplary embodiment, the sound receiver 10 may successively receive the voices ($V_1, V_2, \ldots, V_n$) uttered by at least one speaker ($S_1, S_2, \ldots, S_n$) after lapse of a specific time, and may then output the electrical signal. In accordance with another exemplary embodiment, the voice receiver 10 may receive the voices ($V_1, V_2, \ldots, V_n$) uttered by at least one speaker ($S_1, S_2, \ldots, S_n$) during a predetermined time period predefined by a designer or user, and may then output the electrical signal.

In accordance with an exemplary embodiment, the sound receiver 10 may initiate or stop operation upon receiving a control signal from the processor 20.

In accordance with an exemplary embodiment, the apparatus for selecting a task based on a voice command may include a plurality of sound receivers 10.

As described above, the plurality of sound receivers 10 may be implemented as a plurality of microphones. In other words, the apparatus for selecting a task based on a voice command may include a plurality of microphones. The plurality of microphones may be provided to correspond to the plurality of speakers, respectively. In the present case, the positions of the plurality of speakers ($S_1, S_2, \ldots, S_n$) may also be identified using the plurality of microphones, respectively.

The plurality of sound receivers 10 may be disposed at a plurality of positions. The plurality of sound receivers 10 may independently and respectively receive the voices ($V_1, V_2, \ldots, V_n$) uttered by at least one speaker ($S_1, S_2, \ldots, S_n$), and may output the respective voices ($V_1, V_2, \ldots, V_n$) to the processor 20.

Although the respective sound receivers 10 receive the voices uttered by the same speakers ($S_1, S_2, \ldots, S_n$), the respective sound receivers 10 may generate different voice signals having different strengths and/or different shapes according to a distance between a sound source and the sound receivers 10 (i.e., according to at least one of the distance and a direction between the plurality of respective speakers ($S_1, S_2, \ldots, S_n$) and the sound receivers 10). Accordingly, when the plurality of sound receivers 10 are provided, at least one of the position and direction of at least one speaker ($S_1, S_2, \ldots, S_n$) may be determined and identified. In the present case, at least one of the position and direction of at least one speaker ($S_1, S_2, \ldots, S_n$) may be determined and identified on the basis of the respective sound receivers 10.

The processor 20 may select and decide at least one necessary task on the basis of the voice signal generated by the sound receiver 10, and may also decide the order of processing tasks.

In accordance with an exemplary embodiment, the processor 20 may include at least one of a Central Processing Unit (CPU), a Micro Controller Unit (MCU), and an electronic control unit (ECU), and the CPU, the MCU, and the ECU may be implemented using at least one semiconductor chip, a substrate, associated components, etc.

The processor 20 may execute a program stored in the storage portion 80, may select and determine one or more tasks, and may determine the order of processing the tasks. In the present case, the processor 20 may retrieve various kinds of data from the storage portion 80, and may store the various kinds of data in the storage portion 80.

In addition, the processor 20 may sequentially, or in parallel, generate control signals corresponding to tasks to be processed on the basis of the decided tasks and the decided processing order of the tasks, and may also transmit the generated control signals to a controlled device 9 corresponding to the task to be processed. Here, the controlled device 9 may refer to a device to be controlled by apparatus 1.

In the present case, the controlled device 9 may include various devices configured to be controlled by the apparatus 1 for selecting a task based on a voice command or constituent components of the various devices. For example, the controlled device 9 may include a vehicle, construction equipment, a robot, various electronic appliances, mobile terminals including a smartphone or tablet, a navigation device, a desktop computer, a laptop, a game console, etc., and may further include constituent components thereof, for example, processors, displays, etc. of the controlled device 9. However, the scope or spirit of the controlled device 9 and associated components thereof is not limited thereto, and at least one of the various devices or components considered by the designer may be the above-mentioned controlled device 9 or components. The controlled device 9 may further include other constituent components included in the apparatus 1 for selecting a task based on the voice command. For example, when the apparatus 1 for selecting the task based on the voice command is implemented as the navigation device, the controlled device 9 may include a display panel, etc. mounted to the navigation device.

Detailed operations of the processor 20 are to be described below.

The storage portion 80 may temporarily or non-temporarily store at least one datum needed to operate the processor 20 and/or at least one datum generated by the processor 20. The storage portion 80 may be implemented using at least one storage medium for permanently, or semi-permanently, storing data, for example, a flash memory device, a Secure Digital (SD) card, a Solid State Drive (SSD), a Hard Disk Drive (HDD), a magnetic drum, a compact disc (CD), a laser disc, a magnetic tape, a magneto-optical disc, a floppy disk, etc.

For example, referring to FIG. The storage portion 80 may store at least one of: identification (ID) information 81 including information for temporarily or non-temporarily identifying at least one speaker; an operation initiation keyword DB 83 including at least one operation initiation keyword; an importance DB 85 including at least one task and an importance value corresponding to the at least one task; and a task DB 87 including at least one task corresponding to the at least one keyword. When necessary, the storage portion 80 may also be configured to implement a task table 89 constructed using information associated with the task decided by the processor 20.

In addition, the storage portion 80 may further store various kinds of information associated with the operation of the apparatus 1 for selecting the task based on the voice command.

Figure 2:
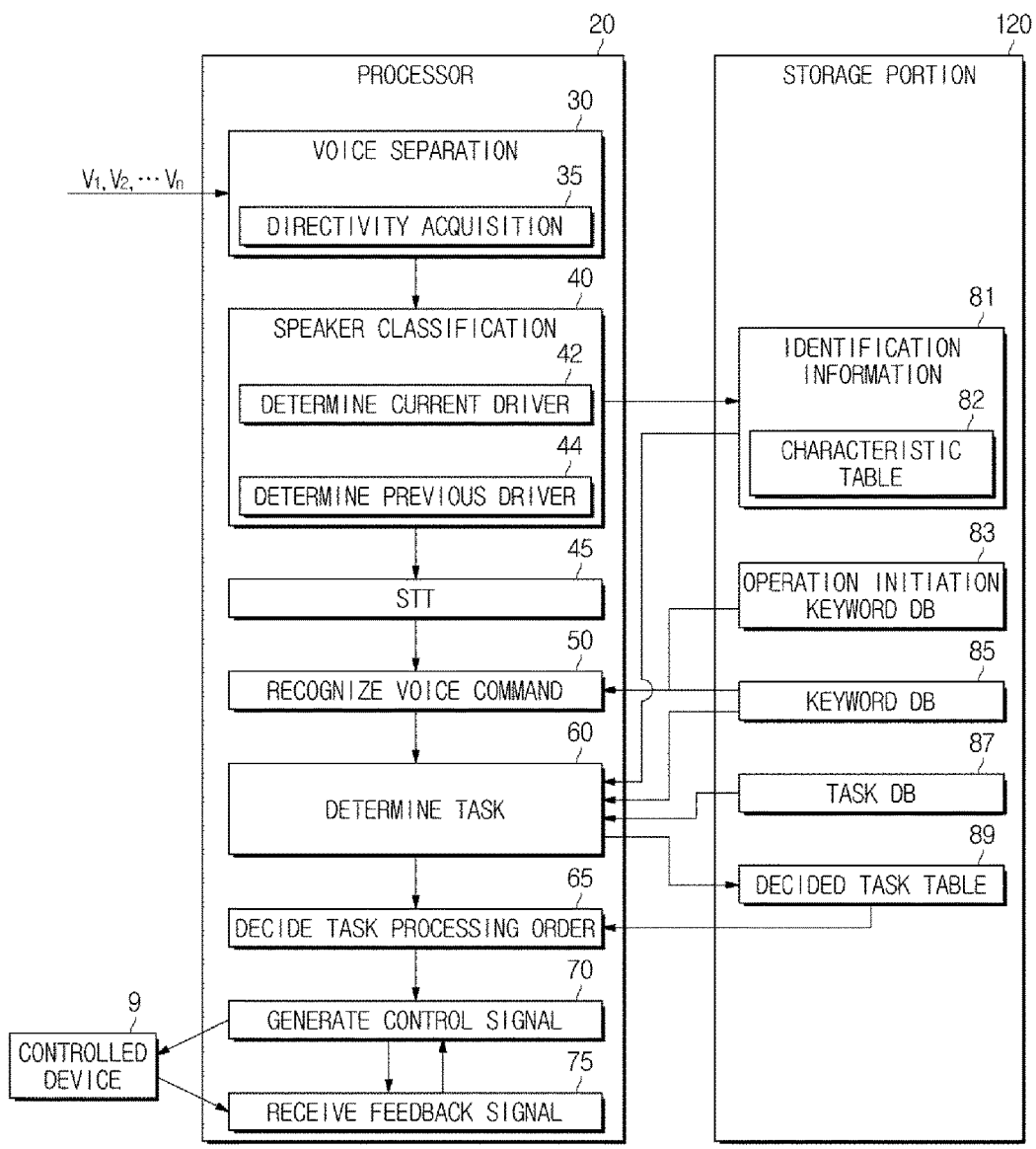
FIG. 2 is a conceptual diagram illustrating operations of a processor according to an exemplary embodiment of the present invention.

FIG. 2 is a conceptual diagram illustrating operations of the processor according to an exemplary embodiment of the present invention.

Referring to FIG. 2, the processor 20 may separate voice signals corresponding to the voices ($V_1, V_2, \ldots V_n$) received from at least one speaker from each other (Operation 30), may classify the respective speakers corresponding to the respective voices (Operation 40), may convert the respective voice signals into text data and acquire the text data (STT, Speech To Text, Operation 45), may recognize a voice command from the acquired text (Operation 50), may determine a task corresponding to the recognized command, and may determine the order of processing the decided tasks (Operation 65). When the tasks and the order of processing the tasks are decided, the processor 20 may generate a control signal for a predetermined task according to the order of processing the tasks, and may transmit the generated control signal to the controlled device 9 (Operation 70). When necessary, the processor 20 may receive a feedback signal corresponding to a task result from the controlled device 9 (Operation 75).

In more detail, the processor 20 may acquire a voice signal corresponding to a voice of at least one speaker ($S_1, S_2, \ldots, S_n$) from the voice signal generated from the sound receiver 10 (Operation 30).

Assuming that the voices ($V_1, V_2, \ldots, V_n$) of the plurality of speakers ($S_1, S_2, \ldots, S_n$) are mixed in the sound receiver 10 and the sound receiver 10 thus outputs mixed voice signals, the processor 20 may separate the plurality of voice signals corresponding to the respective voices ($V_1, V_2, \ldots, V_n$) of the plurality of speakers ($S_1, S_2, \ldots, S_n$) from the mixed voice signals, and may thus acquire separated voice signals.

In accordance with an exemplary embodiment, the processor 20 may separate the plurality of voice signals from the mixed voice signals using frequency characteristics of the sound signals (i.e., the voices ($V_1, V_2, \ldots, V=n$) uttered by the speakers ($S_1, S_2, \ldots$, received from the respective sound sources, and may thus detect the separated voice signals.

In accordance with another exemplary embodiment, the processor 20 may analyze the directivities of the respective voices ($V_1, V_2, \ldots, V_n$) of the respective speakers ($S_1, S_2, \ldots, S_n$), and may separate the respective voice signals from each other and acquire the separated voice signals (Operation 35). When the directivities of the voices ($V_1, V_2, \ldots, V_n$) are acquired, the processor 20 may determine and specify the utterance positions of the speakers ($S_1, S_2, \ldots, S_n$) on the basis of the directivities of the voices ($V_1, V_2, \ldots, Vn$), and may separate the voices corresponding to the plurality of voices ($V_1, V_2, \ldots, V_n$) from the mixed voice signals and detect the separated voices.

In more detail, the apparatus 1 may include a plurality of sound receives 10, and the plurality of sound receivers 10 may be at a plurality positions. The respective sound receivers 10 may be implemented as bidirectional or unidirectional microphones. When the speakers ($S_1, S_2, \ldots, S_n$) respectively utter the voices ($V_1, V_2, \ldots, V_n$), the respective sound receivers 10 may receive the plurality of voices ($V_1, V_2, \ldots, V_n$) and may receive different voices ($V_1, V_2, \ldots, V_n$) in a plurality of means according to the directivities of the sound receivers 10 and the relative positions of the speakers ($S_1, S_2, \ldots, S_n$). Therefore, the respective sound receivers 10 may output different mixed voice signals. For example, any one of the sound receivers 10 may primarily receive the voice ($V_1$) uttered by a specific speaker (e.g., the first speaker $S_1$), and may receive the voices ($V_2, \ldots, V_n$) uttered by other speakers (e.g., the second to Nth speakers $S_2, \ldots, S_n$) at a relatively lower reception level as compared to the remaining sound receivers 10. The positions of the sound receivers 10 are generally well-known, and a comparison and analysis results of the voice signals generated from the respective sound receivers 10 are as follows. The voice signals corresponding to the respective voices ($V_1, V_2, \ldots, V_n$) are separated from the mixed voice signals, the positions of sound sources corresponding to the voice signals (i.e., the positions of speakers $S_1, S_2, \ldots Sn$) may be estimated and determined.

Subsequently, the processor 20 may identify and classify the speakers on a basis of not only the separated voice signals but also spatial positions of the speakers ($S_1, S_2, \ldots, S_n$) corresponding to the separated voice signals (Operation 40). Subsequently, the processor 20 may generate ID information 81 on the basis of the identification and classification result of the speakers, and may transmit the generated identification information 81 to the storage portion 80, wherein the identification information 81 may be stored in the storage portion 81.

In accordance with an exemplary embodiment, the processor 20 may extract characteristic information from the respective separated voice signals, and may classify and identify the speakers ($S_1, S_2, \ldots, S_n$) having uttered the voices ($V_1, V_2, \ldots, V_n$) corresponding to the separated voice signals, wherein the processor 20 may acquire the identification result (i.e., identification information 81).

In more detail, the voices ($V_1, V_2, \ldots, V_n$) uttered by different speakers ($S_1, S_2, \ldots, S_n$) may have different characteristics according to characteristics of the speakers ($S_1, S_2, \ldots, S_n$) (e.g., gender, age, oral structure, language environment, etc.). Therefore, the respective separated voice signals may have unique features (characteristics) according to the corresponding speakers ($S_1, S_2, \ldots, S_n$). The processor 20 may extract information regarding features corresponding to the respective voice signals from the respective separated voice signals, and may classify and identify the speakers ($S_1, S_2, \ldots, S_n$) on the basis of the extracted characteristic information. Here, the characteristic information may include, for example, characteristic vectors.

The processor 20 may extract characteristic information from the respective separated voice signals of the respective speakers ($S_1, S_2, \ldots, S_n$) using a predetermined algorithm. Here, the predetermined algorithm may include a learning algorithm.

In accordance with an exemplary embodiment, the processor 20 may extract characteristic information related to the voice signals corresponding to the respective speakers ($S_1, S_2, \ldots, S_n$) using a Linear Predictive Coding (LPC) method and/or a Fast Fourier Transform Cepstrum (FFTC) method, etc.

When the speakers ($S_1, S_2, \ldots, S$) corresponding to the respective separated voice signals are identified, the processor 20 may generate identification information 81 on the basis of the identification result of the speakers ($S_1, S_2, \ldots, S_n$), and may store the generated identification information 81 in the storage portion 80.

FIG. 3 is a diagram illustrating various exemplary embodiments of a characteristic table.

In accordance with an exemplary embodiment, the identification information 81 may include, for example, a characteristic table 82 as shown in FIG. 3.

The characteristic table 82 may include a plurality of records 82a to 82d corresponding to the number of speakers ($S_1, S_2, \ldots, S_n$). The number of records 82a to 82d may be defined by the designer or user in consideration of the number of voices ($V_1, V_2, \ldots, V_n$), or may be defined by the processor 20 on the basis of the number of voices ($V_1, V_2, \ldots, V_n$) identified whenever the respective speakers ($S_1, S_2, \ldots, S_n$) are identified.

Each of the records 82a to 82d may include a plurality of fields. For example, the respective records 82a to 82d may include fields of identifiers for identifying the respective records 82a to 82d, fields for the positions of the speakers ($S_1, S_2, \ldots, S_n$), and fields for characteristics of the extracted voice signals. Identifiers, the positions of speakers ($S_1, S_2, \ldots, S_n$), and characteristics of the extracted voice signals may be stored in the respective fields of the respective records 82a to 82d. For example, the record 82a of the first identifier may store a symbol (e.g., 0001) indicating the first identifier and information (e.g., the position (e.g., front left) of the first speaker $S_1$, characteristics (i.e., FDAG, . . . ) of the voice of the first speaker s1) regarding a speaker corresponding to the first identifier, etc. In the present case, the positions of the speakers ($S_1, S_2, \ldots, S_n$) and the identifiers of characteristics of the extracted voice signals may be arbitrarily defined by the processor 20. Therefore, the voice utterance position and the voice characteristic information may be recorded to be matched to each other.

The identification (ID) information 81 may be temporarily or non-temporarily stored in the storage portion 80. For example, the ID information 81 may be stored in the storage portion 80 for a predefined time period, and/or may be stored in the storage portion 80 when new data is added or until the remaining storage volume of the storage portion 80 is considered insufficient.

When the apparatus 1 for selecting a task based on a voice command is mounted to the vehicle, the processor 20 may further determine a current driver as shown in FIG. 2 (Operation 42).

The processor 20 may further classify and identify a voice of the current driver on the basis of the analysis result of directivities of the respective voices ($V_1, V_2, \ldots, V_n$). In more detail, the processor 20 may detect a voice signal, an utterance position of which is a driver seat, from among the separated voice signals, and may determine the detected voice signal to be a voice signal uttered by the driver accommodated in the driver seat. The processor 20 already has information regarding the driver seat. When the utterance position of any one voice signal is identical to or located closer to the driver seat, the processor 20 may determine that the utterance position is the driver seat and the any one voice signal is a voice uttered by the driver accommodated in the driver seat.

Subsequently, the processor 20 may add information 82e indicating the driver to the field indicating the presence or absence of the driver in the characteristic table 82 as shown in FIG. 3. For example, when the position (e.g., a front left) of the voice signal corresponding to the first identifier is the position of the driver seat, the processor 20 may add information 82e indicating the driver to the record 82a regarding the first identifier. Therefore, when the voice signal having the same voice characteristics as the voice characteristics of the first identifier is acquired, the processor 20 may determine that the acquired voice signal is the utterance of the driver accommodated in the driver seat.

FIG. 4 is a first drawing illustrating various exemplary embodiments of the characteristic table, and FIG. 5 is another drawing illustrating various exemplary embodiments of the characteristic table.

When the apparatus 1 for selecting a task based on a voice command is mounted to the vehicle, the processor 20 may further determine a previous driver. Here, the previous driver may include users who have driven the same vehicle in the past, wherein the previous driver may more correctly recognize necessary information requisite for the vehicle, for example, fuel consumption rate, etc.

The processor 20 may compare the pre-stored identification information 81 (e.g., voice characteristics stored in the characteristic table 82) with voice characteristics stored in a newly acquired characteristic table 82f, and may determine the previous driver according to the result of a comparison as shown in FIG. 4 and FIG. 5. In the present case, the driver who has driven the vehicle within a predetermined time period corresponding to the storage time of the identification (ID) information 81 may be verified and determined to be the previous driver.

For example, as shown in FIG. 4, the processor 20 may separate the newly input mixed voice signals from each other, may acquire the plurality of separated voice signals, and may acquire a new characteristic table 82*f* including a plurality of records 82*g* to 82*j* on the basis of the result of extracting characteristics of the respective separated voice signals. In addition, the processor 20 may determine a new current driver on the basis of the utterance positions of the respective voice signals, and may add specific information 82*k* indicating the current driver to the record 82*g* having a voice signal of the current driver.

Subsequently, the processor 20 may determine whether the characteristic table 82 is pre-generated and the generated characteristic table 82 is pre-stored in the storage portion 80, as shown in FIG. 3. When the pre-stored characteristic table 82 is present in the storage portion 80, the processor 20 may compare the respective characteristics extracted from the separated voice signals with other characteristic(s) of the respective records 82*a* to 82*d* of the characteristic table 82, and may determine a presence or absence of a same value between the extracted characteristics and the other characteristics.

When the same characteristic as those of the respective records 82*a* to 82*d* of the pre-stored characteristic table 82 are detected in the characteristics extracted from the new voice signal, the processor 20 may confirm whether information 82*k* indicating the current driver is added to the record (e.g., the second record 82*h*) corresponding to the detected characteristics.

When the current driver information 82*k* is added to the second record 82*h*, the processor 20 may determine that the current driver is identical to the previous driver. In other words, the processor 20 may determine that the driver has not changed, and may maintain the acquired new characteristic table 82*f*.

In contrast, when information 82*k* indicating the current driver is not added, the processor 20 may determine that the current driver is not identical to the previous driver. That is, the processor 20 may determine that the driver has not changed, and the record corresponding to the detected characteristics (for example, information 82*i* indicating the previous driver) is added to the second record 82*h* as shown in FIG. 5.

Therefore, the processor 20 may acquire and store specific information configured to identify the current driver and the voice of the current driver. When necessary, the processor 20 may acquire and store information configured to identify the previous driver and the voice of the previous driver. Therefore, the processor 20 may recognize the voice of the current driver, the voice of the previous driver, or a voice of another person (i.e., non-driver) not corresponding to the current or previous driver, and may differentially determine tasks and the processing order of the tasks according to whether a person who utters a voice command is the current driver, the previous driver, or the non-driver.

As described above, when additional information for the separated voice signal is determined and stored, the processor 20 may recognize the respective separated voice signals, and may convert the recognized voice signals into text data (Operation 45). Therefore, at least one text datum corresponding to any one voice signal may be acquired.

For example, the processor 20 may recognize at least one voice signal using at least one of a Dynamic Time Warping (DTW) method, Hidden Markov model, and Artificial Neutral Network (ANN), and may convert the recognized voice signal into text data.

Sequentially, the processor 20 may acquire text data constructed in a text format corresponding to the voice signal, may analyze the acquired text data, and may recognize a voice command (Operation 50).

In accordance with an exemplary embodiment, the processor 20 may determine whether the operation initiation keyword is detected from the text data, prior to recognition of the voice command. The operation initiation keyword may refer to a keyword for determining whether the voices ($V_1, V_2, \ldots, V_n$) uttered by the speakers ($S_1, S_2, \ldots, S_n$) are relevant or irrelevant to the voice command. For example, the operation initiation keyword may include monosyllabic or multisyllabic words, and phrases or sentences including a plurality of words, etc. In more detail, the operation initiation keyword may include a name or nickname of the apparatus 1, an exclamation including "Hey", and/or unique words configured to be distinguished from other daily words. The operation initiation keyword may be defined by the designer and/or users.

In accordance with an exemplary embodiment, as shown in FIG. 2, the processor 20 may compare the operation initiation keyword stored in the operation initiation keyword DB 83 with the text data, and may determine the presence or absence of the operation initiation keyword in the text data.

When the operation initiation keyword is detected from the text data, the processor 20 may determine the detected keyword to be a keyword for initiating the voice command recognition operation, and may sequentially initiate the operations of the voice commands converted into a letter format. For example, assuming that the operation initiation keyword is detected from the text data corresponding to the voice ($V_1$) uttered by the first speaker ($S_1$) and the operation initiation keyword is detected from the text data corresponding to the voice signal ($V_3$) uttered by the third speaker ($S_3$), the processor 20 may determine a task corresponding to the voice command using only the text data (from which the operation initiation keyword is detected) corresponding to the voice ($V_1$) uttered by the first speaker ($S_1$).

When the voice command recognition operation initiates, the processor 20 may search for and extract the keyword related to the task from the sentence constructed after utterance of the operation initiation keyword, and may recognize a voice command using the extracted keyword.

In accordance with an exemplary embodiment, the processor 20 may interpret the keyword DB 85, and may detect a predetermined keyword from the text data. For example, the processor 20 may search for the presence or absence of the identical keyword or a word similar to the keyword stored in the keyword DB 85 on the basis of the text data, and may detect the keyword from the text data based on the search result. The keyword may include letters, words, or phrases related to the operation of the apparatus 1 for selecting the task based on the voice command. For example, the keyword may include various letters, words or phrases, for example, tire, tire pressure, gas station, gasoline, fuel, destination, home, office, radio, channel switching, headlights, interior lights, air-conditioner, brake, etc.

Therefore, the processor 20 may recognize a voice command included in the voice signal.

In accordance with an exemplary embodiment, the processor 20 may independently extract at least one keyword for each separated voice signal. For example, the processor 20 may detect at least one keyword from text data corresponding to the voice ($V_1$) uttered by the first speaker ($S_1$), and may detect at least one keyword from text data corresponding to the voice ($V_2$) uttered by the second speaker ($S_2$) at the same time or at different times. In the present case, the keywords detected from the respective text data may be identical to or different from each other.

The extracted keywords may be temporarily or non-temporarily stored in the storage portion 80 as necessary.

FIG. 6 illustrates an exemplary embodiment of a task database (DB).

Referring to FIG. 6, the processor 20 may determine a task corresponding to the recognized voice command (Operation 60). In more detail, when the keyword related to the task is detected from the text data according to the voice command recognition result, the processor 20 may determine a task corresponding to the detected keyword, and may thus determine the task to be performed by the apparatus 1 for selecting the task based on the voice command.

In accordance with an exemplary embodiment, the processor 20 may determine the task using the task DB 87 as shown in FIG. 2 and FIG. 6.

The task DB 87 may include selectable tasks and priorities corresponding to the selectable tasks. The priorities may indicate the degree of importance of the respective tasks using a numerical method or other similar methods. The priorities may be predefined according to an arbitrary selection of at least one of the user and the designer.

In accordance with an exemplary embodiment, the designer may assign a high numerical value to a relatively high-importance task, and may assign a low numerical value to a relatively low-importance task, wherein the priorities of the respective tasks may be defined. As shown in FIG. 6, a relatively high priority may be assigned to words or phrases (e.g., tire pressure or brake) related to a safety of the speakers ($S_1, S_2, \ldots, S_n$), and a relatively low priority may be assigned to other words or phrases (e.g., radio or channel switching) irrelevant to the safety of the speakers ($S_1, S_2, \ldots, S_n$).

In accordance with another exemplary embodiment, the designer may assign a low value to a relatively-high-priority task, and may assign a high value to a relatively-low-priority task in an opposite way to the above-mentioned method, wherein each priority corresponding to each of the respective tasks may also be defined.

In accordance with an exemplary embodiment, the task DB 87 may also be implemented as a corpus. When the apparatus 1 for selecting the task based on the voice command is used in vehicle technology, the corpus may relate to vehicles.

The processor 20 may read the task DB 87, may extract at least one task identical or similar to at least one keyword detected from the text data in the task DB 87, and may determine the extracted task to be at least one task corresponding to a voice command.

In addition, the processor 20 may also determine the task for each keyword when the respective keywords are detected from different separated voice signals. In the present case, a task corresponding to the keyword extracted from any one separated voice signal and a task corresponding to the keyword extracted from the other separated voice signal may be identical to or different from each other. In other words, a task corresponding to the voice ($V_1$) uttered by the first speaker ($S_1$) and a task corresponding to the voice ($V_2$) uttered by the second speaker ($S_2$) may be identical to or different from each other.

FIG. 7 is a table illustrating the decision result of at least one task.

Referring to FIG. 7, when the task is decided, the processor 20 may store the decided task in the storage portion 80. In accordance with an exemplary embodiment, the processor 20 may store tasks decided for the respective separated voice signals in the storage portion 80.

For example, as shown in FIG. 7, the processor 20 may generate the decision result in the form of the task table 89, wherein at least one task may be stored in the storage portion 80.

In accordance with an exemplary embodiment, the task table 89 may be generated by including task(s) decided in response to the separated voice signal, priorities corresponding to the decided task(s), and information as to whether any of the speakers ($S_1, S_2, \ldots, S_n$) is the driver.

For example, assuming that a keyword detected from the voice signal corresponding to the first speaker ($S_1$) denotes a gas station search, a keyword detected from the voice signal corresponding to the second speaker ($S_2$) denotes channel switching, a keyword detected from the voice signal corresponding to the third speaker ($S_3$) denotes air-conditioner driving, the first speaker ($S_2$) is the previous driver, and the third speaker ($S_3$) is the current driver, the task table 89 may include the decided tasks, for example, gas station search, channel switching, air-conditioner operation, priorities corresponding to the tasks, information as to whether the speakers ($S_1, S_2, \ldots, S_n$) commanding the respective tasks is the driver or a previous driver. In more detail, the gas station search may be instructed by the previous driver, the channel switching may be instructed by the non-driver, and the air-conditioner operation may be instructed by the current driver.

Figure 8:
FIG. 8 is a first diagram illustrating a method for determining an order of processing at least one task by a processor according to an exemplary embodiment of the present invention.

FIG. 8 is a first drawing illustrating a method for determining the order of processing at least one task by the processor according to an exemplary embodiment of the present invention.

Referring to FIG. 8, when the task is decided, the processor 20 may determine the order of processing the tasks on the basis of the decided task (Operation 65).

In accordance with an exemplary embodiment, the processor 20 may decide the order of processing the task on the basis of the priority. For example, assuming the priority of gas station search is set to 4, the priority of channel switching is set to 2, and the priority of air-conditioner is set to 2, the gas station search, the channel switching operation, and the air-conditioner operation may be disposed in order of priority thereof wherein the gas station search, the channel switching operation, and the air-conditioner operation can be sequentially conducted. In the present case, the above-mentioned priorities may be sorted in ascending or descending numerical order, wherein the respective tasks may also be sorted and the order of processing the respective tasks may also be decided.

In addition, as shown in FIG. 8, the processor 20 may decide the order of processing the respective tasks on the basis of priorities, and may change all or some of the processing order of tasks on the basis of priority information, acquiring a new task table 89a. When priority information is assigned to the current driver, the processor 20 may perform position change (i.e., priority order change) of the task (e.g., the air-conditioner operation task) corresponding to the voice command of the current driver, wherein the air-conditioner operation task can be processed prior to the execution of the other tasks (Operation 89b).

In accordance with an exemplary embodiment, the processor 20 may compare the priority of the task corresponding to the voice command of the current driver with a predefined value, and may determine whether the processing order of the task corresponding to the voice command of the current driver will be changed according to the result of the comparison. For example, when the priority of the task corresponding to the voice command of the current driver is lower than a normal priority (e.g., 3), the task order is changed such that the task corresponding to the voice command of the current driver may be processed first. In contrast, when the priority of the task corresponding to the voice command of the current driver is higher than the normal priority (e.g., 3), the processing order of the task corresponding to the voice command of the current driver may remain unchanged.

In contrast, when the priority of the task corresponding to the voice command of the current driver is lower than normal importance, the processor 20 may change the task order such that the task corresponding to the voice command of the current driver may be processed first. Otherwise, the processing order of the task may remain unchanged.

In addition, the processor 20 may also additionally change the processing order of the task using specific information as to whether a person uttering the voice is not only the current driver but also the previous driver. In the present case, the processor 20 may change the task order such that the task corresponding to the voice command of the current driver may be processed prior to the execution of the task corresponding to the voice command of the previous driver. Alternatively, the processor 20 may also change the task order such that the task corresponding to the voice command of the previous driver may be processed prior to the execution of the task corresponding to the voice command of the current driver.

Figure 9:
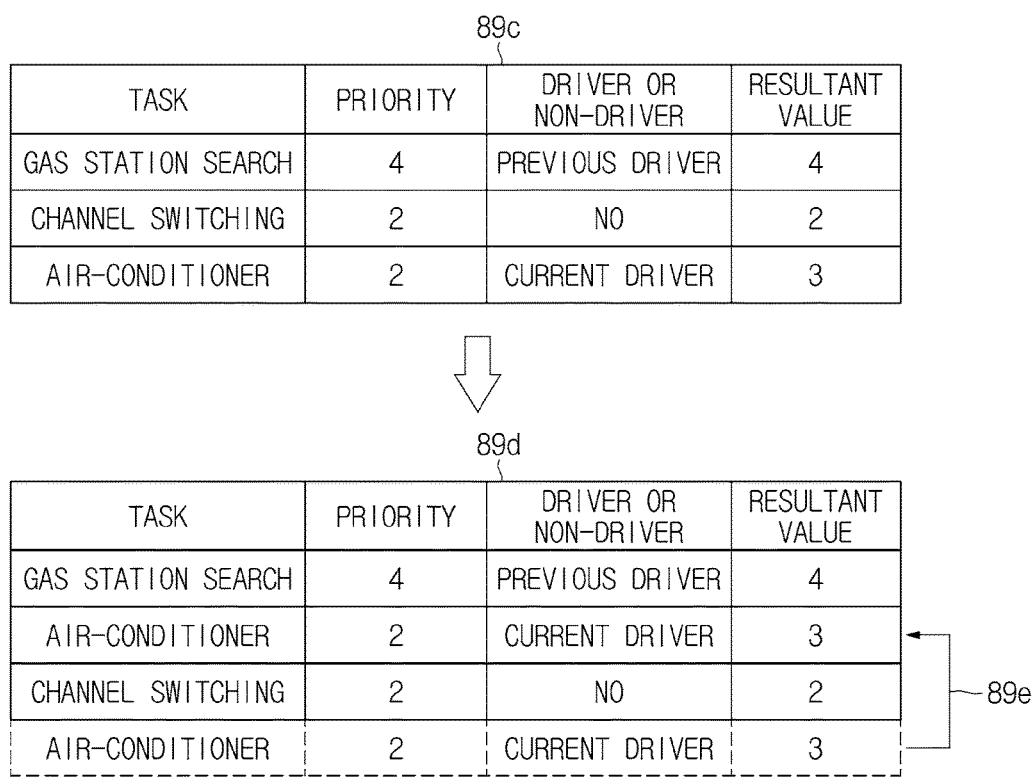
FIG. 9 is a second diagram illustrating a method for determining a processing order of at least one task by a processor according to an exemplary embodiment of the present invention.

FIG. 9 is another drawing illustrating a method for determining the processing order of at least one task by the processor.

In accordance with another exemplary embodiment, as shown in FIG. 9, the processor 20 may further determine an additional resultant value, and may also determine the task order on the basis of the determined resultant value. For example, the processor 20 may combine priority information related to the respective tasks with specific information as to whether a speaker of the task is at least of the current driver and the previous driver, and may determine a predetermined resultant value. In more detail, the processor 20 may add a specific value, which is allocated according to the presence or absence of the driver, to the priority value for each task, acquiring the resultant value. The specific value may be defined by a selection of the designer or user.

When the resultant value is acquired, the processor 20 may sort or rearrange the respective tasks in ascending or descending numerical order according to the resultant value, wherein the processing order of the respective tasks is decided.

In more detail, as shown in FIG. 9, the resultant value corresponding to the task spoken by the current driver may be determined by adding a predetermined value (e.g., 1) to the priority value, and the other resultant value corresponding to the remaining tasks may be determined to have the same level of the priority (Operation 83*c*). The processor 20 may arrange tasks based on the acquired resultant values. In the present case, for example, the resultant value corresponding to the channel switching task instructed by the non-driver is set to 2, the resultant value corresponding to the air-conditioner operation task instructed by the current driver is set to 3, and the processor 20 may perform a position change (i.e., priority order change) of the task, wherein the air-conditioner operation task may be processed prior to the execution of the channel switching task (Operation 89*e*).

When the task processing order is decided as described above, the processor 20 may sequentially or simultaneously generate the control signal according to the decided task and the task processing order, and may transmit the control signal to the corresponding controlled device 9 (Operation 70). In the present case, the controlled device(s) 9 corresponding to the respective control signals may be identical to or different from each other.

For example, when the task processing order is decided as shown in FIG. 8, the processor 20 may generate a control signal for the air-conditioner upon receiving an instruction of the current driver, may transmit the generated control signal to the air-conditioner, may generate a control signal for a gas station search, and may then transmit the control signal for the gas station search to the navigation device. Subsequently, the processor 20 may generate a control signal related to a channel switching, and may transmit the generated control signal to a broadcast receiver for vehicles.

When necessary, the processor 20 may receive a feedback signal corresponding to the control signal generated from the controlled device 9. In the present case, the processor 20 may generate and transmit a control signal for other tasks in response to the reception of the feedback signal.

For example, the processor 20 may transmit a control signal to one highest-priority controlled device 9 (e.g., the air-conditioner) having the first processing order. Subsequently, when the processor 20 receives a control signal related to a reception acknowledgement or a feedback signal related to an operation initiation from the air-conditioner, the processor 20 may generate a control signal for the controlled device 9 (e.g., the navigation device) having the second processing order in response to the reception of the feedback signal, and may transmit the control signal to the navigation device. In addition, upon receiving a feedback signal from the navigation device, the processor 20 may transmit a control command to the controlled device 9 (e.g., a broadcast receiver for vehicles) having the third processing order.

In accordance with an exemplary embodiment, after the task decision is achieved as described above, when a new voice signal is received and the received voice signal includes the operation initiation keyword, the processor 20 may further decide a new task, may decide the processing order of the decided task, and may generate a control signal corresponding to the decided task.

In accordance with an exemplary embodiment, after the processor 20 transmits all the control signals corresponding to the predetermined tasks, the processor 20 may perform at least one of determining a new task, determining the processing order of the decided task, and generating a control signal. In addition, according to another exemplary embodiment, the processor 20 may decide a new task. When the newly decided task has a higher priority than the other legacy tasks, the processor 20 may process a new task earlier than legacy tasks. For example, when the newly decided task is based on the driver's utterance, when a priority or a resultant value of the newly decided task is relatively higher than a priority or a resultant value of the legacy task, or when the priority or the resultant value of the newly decided task is relatively lower than the priority or the resultant value of the legacy task, the processor 20 may also process the newly decided task earlier than the legacy task.

As described above, the processor 20 may decide a task on the basis of voice signals corresponding to voices of the plurality of speakers ($S_1, S_2, \ldots, S_n$), may decide the order of the decided task, and may control the controlled device 9 according to the result of the decision. When necessary, some of the above operations may herein be omitted. In addition, the processor 20 may further perform the remaining operations other than the above-mentioned operations.

In accordance with an exemplary embodiment, the apparatus 1 for selecting the task based on the voice command may be implemented as various devices. For example, the apparatus 1 may include a vehicle, construction equipment, a robot, various electronic appliances, and mobile terminals including a smartphone or tablet, a navigation device, a desktop computer, a laptop, a game console, etc.

A vehicle to which the apparatus 1 for selecting the task based on the voice command is applied will hereinafter be described.

Figure 10:
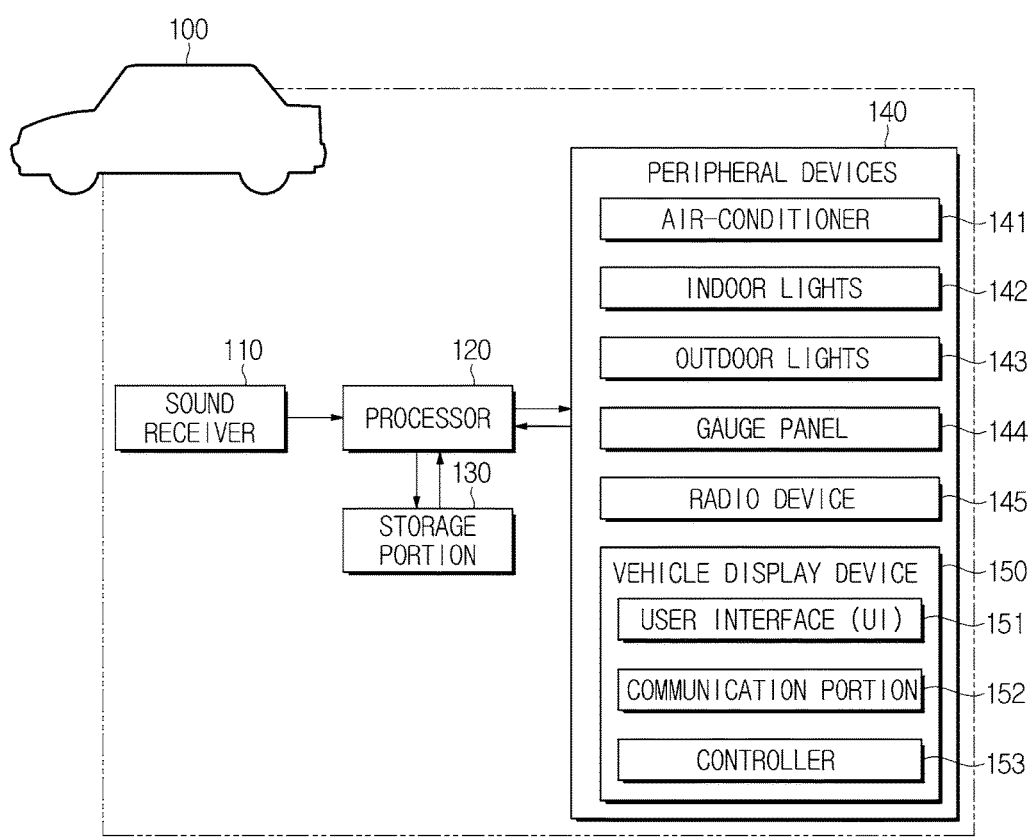
FIG. 10 is a block diagram illustrating a vehicle according to an exemplary embodiment of the present invention.
Figure 11:
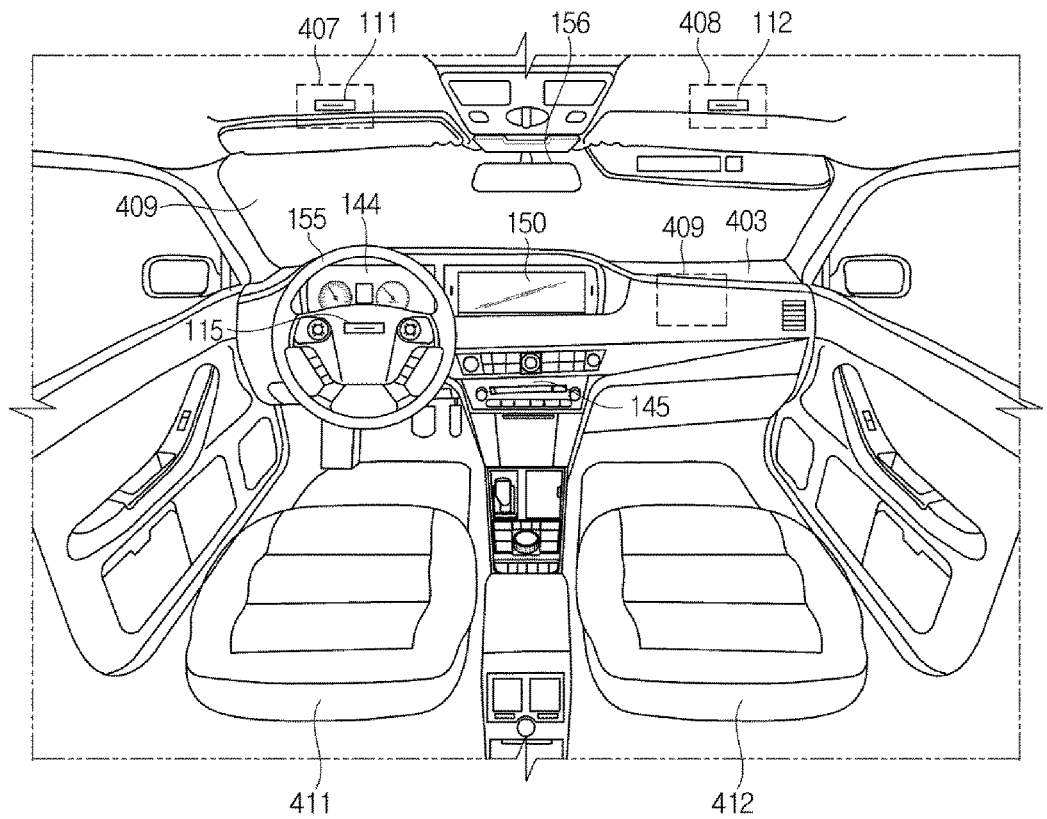
FIG. 11 is a view illustrating an internal structure of the vehicle shown in FIG. 10 according to an exemplary embodiment of the present invention.
Figure 12:
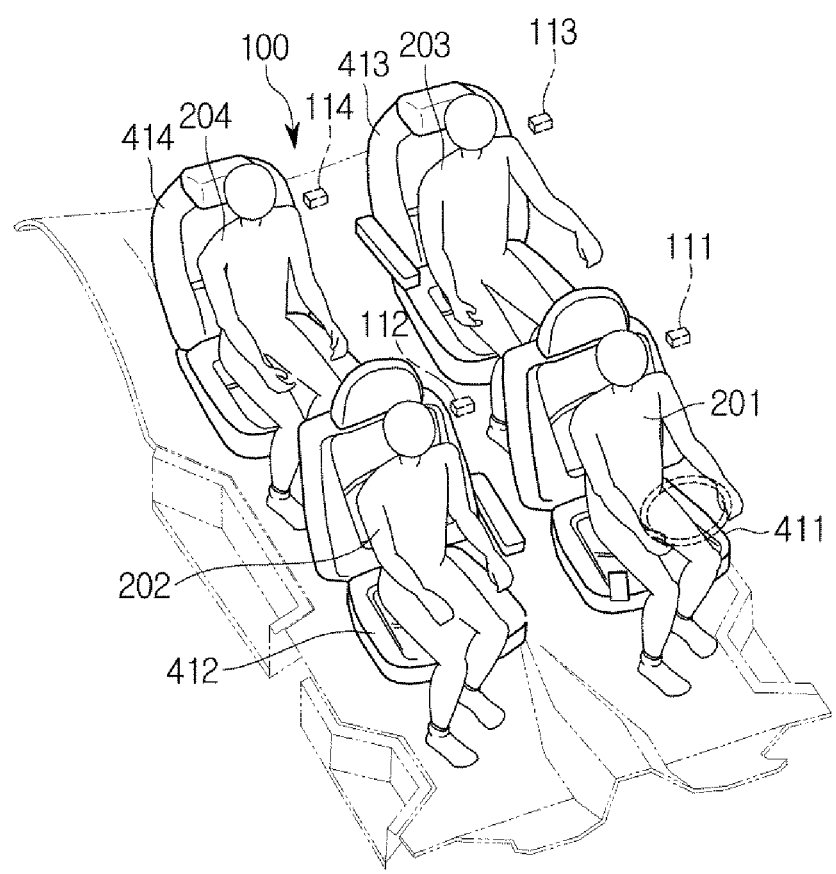
FIG. 12 is a view illustrating a plurality of occupants who ride in a vehicle according to an exemplary embodiment of the present invention.

FIG. 10 is a block diagram illustrating the vehicle. FIG. 11 is a view illustrating an internal structure of the vehicle shown in FIG. 10 according to an exemplary embodiment of the present invention. FIG. 12 is a view illustrating a plurality of users who occupy the vehicle.

Referring to FIG. 10, the vehicle 100 may include a voice receiver 110, a processor 120, a storage portion 130, and a plurality of peripheral devices 140.

The sound receiver 110 may receive at least one voice, and may output an electrical signal corresponding to the received voice. As shown in FIG. 11 and FIG. 12, the sound receiver 110 may be mounted to at least one position located within the vehicle 100.

In accordance with an exemplary embodiment, only one sound receiver 110 may be mounted to the vehicle 100. Here, the sound receiver 110 may be disposed at a predetermined position in which voices of all occupants of the vehicle 100 may be properly received. For example, the sound receiver 110 may be located in a vicinity of a rear-view mirror 145 or in the vicinity of a roof of the vehicle 100.

In accordance with another exemplary embodiment, the sound receiver 110 may include a plurality of sound receivers 111 to 114. The respective sound receivers 111 to 114 may also be disposed at positions in which the voices of the occupants accommodated the respective seats 411 to 414 may be properly received. For example, the sound receivers 111 and 115 are configured to receive a voice from the occupant (e.g., the driver 201) accommodated in the driver seat 411 may be disposed at a rim or spoke of a steering wheel 155, a gauge panel 144, the rear-view mirror 145 or a sun visor 407, or may be disposed in the vicinity of the steering wheel 155, the dashboard 144, the rear-view mirror 145 or the sun visor 407. The sound receiver 112 configured to receive a voice from an occupant 202 who sits in a passenger seat 412 may be disposed at a dashboard 403, a glove box 409, or the sun visor 407, or in the vicinity of the dashboard 403, the glove box 409, or a sun visor 408. In addition, the sound receivers 113 and 114 are configured to receive voices of occupants 203 and 204 accommodated in rear seats 413 and 414 may be mounted to the rear end portion of the roof of the vehicle 100, and/or may be disposed at rear surfaces of the front seats 411 and 412.

Additionally, the sound receivers 110 to 114 may be disposed at various positions located within the vehicle 100, to be considered by the designer.

A detailed structure and operation of the sound receiver 110 has already been disclosed, and as such a detailed description thereof will herein be omitted.

The processor 120 may perform various arithmetic processing, and may control an overall operation of the vehicle 100 or some of the operations of the vehicle 100.

In accordance with an exemplary embodiment, the processor 120 may be directly mounted to the vehicle 100 or may be implemented using an ECU. For example, the ECU may be implemented using at least one semiconductor chip and associated components mounted in an internal compartment (e.g., the region between the engine compartment and the dashboard) of the vehicle 100.

In addition, the processor 120 may also be implemented using a processor of another electronic device located separately from the vehicle 100. For example, the processor 120 may be implemented using a navigation device embedded in the vehicle 100 or detachably coupled to the vehicle 100, or using a CPU or microcontroller unit (MCU) embedded in a head device or smartphone.

In accordance with an exemplary embodiment, the processor 120 may isolate a voice signal corresponding to each voice from the voice signals acquired by a mixture of the plurality of voices, may acquire the isolated voice signal, may determine a position of a speaker corresponding to each isolated voice signal, and may determine a voice signal corresponding to a voice uttered by a driver on the basis of the decided speaker position. In addition, the processor 120 may further decide and acquire the isolated voice signal corresponding to the previous driver from among the isolated voice signals by referring to the pre-stored identification information 81 (e.g., the characteristic table 82).

In addition, the processor 120 may detect the keyword from each of the isolated voice signals, and may recognize at least one voice command corresponding to each isolated voice signal. To the present end, the processor 120 may detect the operation initiation keyword from each isolated voice signal, prior to an execution of the voice recognition operation.

In addition, after recognition of the voice command, the processor 120 may determine a task corresponding to the voice command, and may determine the processing order of the decided task. In the present case, the processor 120 may decide the processing order of the decided task using the predefined priority, and/or may decide the processing order of the decided task using specific information as to whether a person who utters the voice command is any one of the current driver and the previous driver.

The processor 120 may generate a control signal either for the vehicle 100 or for a predetermined device (e.g., the peripheral device 140) embedded in the vehicle 100 according to the decided task and the task processing order, and may transmit the control signal to the corresponding device.

The storage portion 130 may store various kinds of data therein.

In accordance with an exemplary embodiment, the storage portion 130 may store various kinds of information required to operate the processor 120, for example, identification (ID) information, the operation initiation keyword DB, the keyword DB, and/or the task DB, and/or data (e.g., the task table) generated by the processor 120. The storage portion 130 may further store various kinds of information according to various purposes.

The structures and operations of the processor 120 and the storage portion 130 have already been included with reference to FIG. 1, FIG. 2, FIG. 3, FIG. 4, FIG. 5, FIG. 6, FIG. 7, FIG. 8, and FIG. 9, and redundant matters of the exemplary embodiments will be omitted herein for clarity.

The peripheral device 140 may include various devices, which are embedded in the vehicle 100 and are provided for operation of the vehicle 100 or for convenience of the occupants 201 to 204.

For example, the peripheral device 140 may include an air-conditioner 141 to adjust an air temperature of an internal compartment of the vehicle 100; internal lights 142 including LEDs, etc. disposed in the internal of the vehicle 100; external lights 143 including headlights, emergency lights, taillights, and the like; a gauge panel 144 to provide information including speed or RPM to the driver of the vehicle 100; a radio device 145 to receive a broadcast signal corresponding to a selected frequency and output the received broadcast signal; and/or a vehicle display device 150 including a user interface (UI) 151, a communication portion 152, a controller 153, etc. The vehicle display device 150 may perform a navigation function, a television (TV) broadcast reception and output function, a moving-image and still-image display function, or a telephone conversation image display function, etc. In addition, various devices configured to be controlled on the basis of the voice command may be used as exemplary embodiments of the above-mentioned peripheral device 140.

Detailed operations of the vehicle 100 are as follows.

Figure 13:
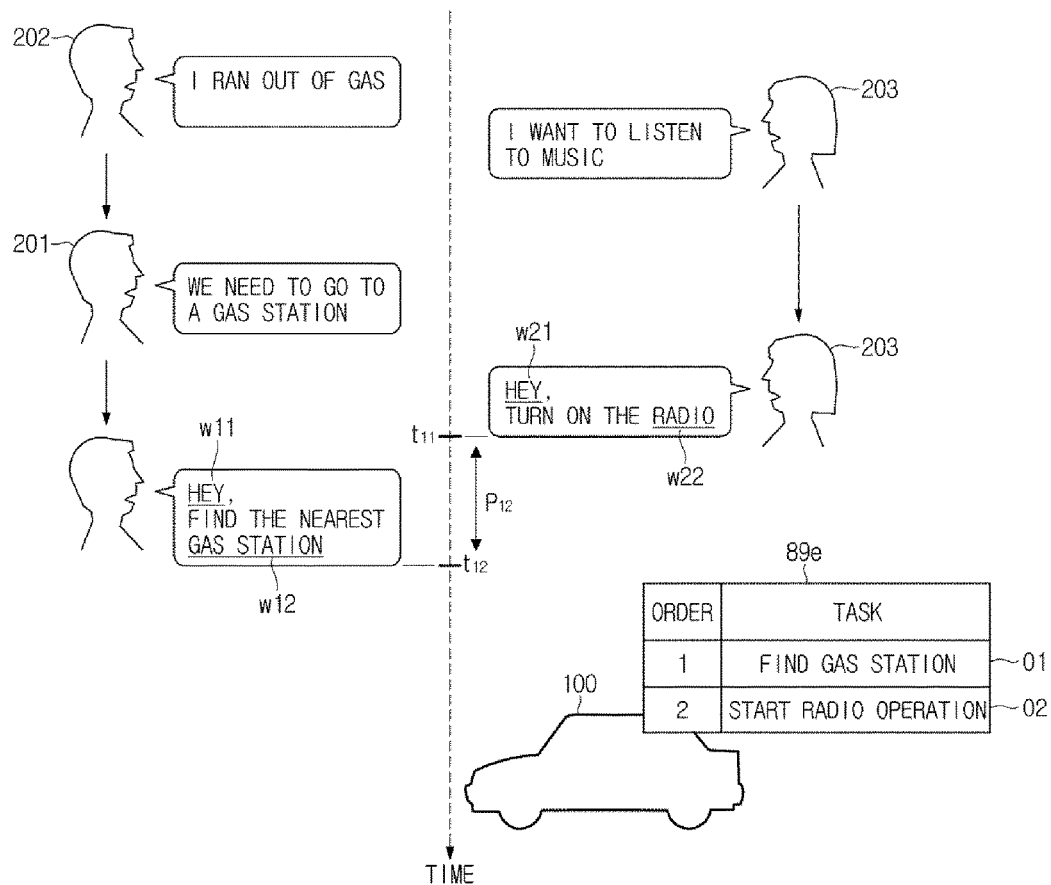
FIG. 13 is a view illustrating an exemplary embodiment of a situation in which several occupants are talking to each other according to an exemplary embodiment of the present invention.

FIG. 13 is a view illustrating an exemplary embodiment of a situation in which a plurality of users are speaking to each other.

The plurality of users 201 to 204 who respectively accommodate the driver seat 411, the passenger seat 412, and the rear seats 413 and 414, as shown in FIG. 12, may respectively utter voices as shown in FIG. 13. The voices uttered by the plurality of users 201 to 204 may be some segments of conversation between the users 201 to 204, or a voice command for the vehicle 100.

When the previous driver 202 accommodated in the passenger seat 412 says "I ran out of gas", the driver 201 answers "We need to go to a gas station" and is able to utter a voice command including the operation initiation keyword (w11) at a second time point ($t_{12}$). Simultaneously or subsequently, another occupant 203 who has no experience driving the vehicle 100 may desire to listen to music and may utter a voice command including an operation initiation keyword (w21) at a first time point ($t_{11}$). In the present case, the first time point ($t_{11}$) may be at a time before the second time point ($t_{12}$).

The respective voice receivers 111 to 115 may receive the above-mentioned voices, and may transmit the voice signals corresponding to the received voices to the processor 120. The processor 120 may analyze a voice signal received in a predetermined time period ($P_{12}$), and may recognize whether the input voice signal is a voice command. The voice signals received for the predetermined time period ($P_{12}$) may also be simultaneously analyzed. When the operation initiation keywords w11 and w21 are detected from the received voice signals (hereinafter referred to as the input voice signals) and are then recognized as a voice command, the processor 120 may extract at least one keyword w12 and w22 from the input voice signals, and may determine at least one task (e.g., a radio operation start task (O2) and a gas station search task (O1)) corresponding to a voice command received for the predetermined time period ($P_{12}$).

The processor 120 may decide the processing order 89e determined to correspond to the voice command entered for the predetermined time period ($P_{12}$). As described above, the processor 120 may decide the processing order 89e of each process using priorities of each process and characteristics (e.g., information as to whether an uttering person is the driver or not) of the person who utters the voice command, and may store the determined result. For example, the processor 120 may first process the gas station search (O1), and may then perform the radio operation start operation (O2). The processor 120 may sequentially generate control signals for constituent components (e.g., the vehicle display device 150 and the radio device 145) of the vehicle 100 according to the decided processing order 89e, and may transmit the generated control signals to the vehicle display device 150 and the radio device 145, wherein the vehicle display device 150 and the radio device 145 may sequentially perform the decided operations.

When the first time point ($t_{11}$) leads the second time point ($t_{12}$), the operation for analyzing a voice signal of the non-driver 203 and the operation for deciding the task based on the analysis result may be performed prior to the operations for analyzing and deciding the voice signal uttered by the driver 201. Information as to whether the first time point ($t_{11}$) is greatly leading the second time point ($t_{12}$) may be determined by comparing the time period ($P_{12}$) between the first time point ($t_{11}$) and the second time point ($t_{12}$) with a predefined comparison time. In the present case, assuming that the current driver 201 or the previous driver 202 does not search for the voice command related to the gas station search operation (O1) within the comparison time, the operation for analyzing the voice signal of the non-driver 203 and the task based on the analysis result, i.e., the operation initiation (O2) of the radio device 145, may be performed first.

A method for selecting a task based on a voice command will hereinafter be described.

Figure 14:
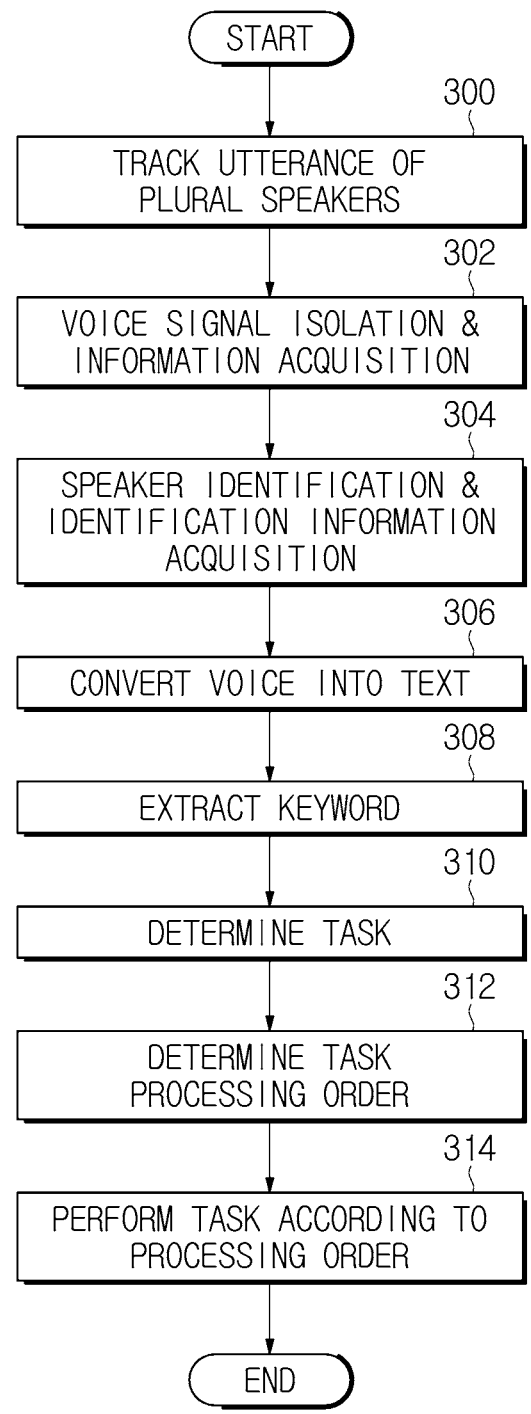
FIG. 14 is a flowchart illustrating a method for selecting a task based on a voice command according to an exemplary embodiment of the present invention.

FIG. 14 is a flowchart illustrating a method for selecting a task based on a voice command.

Referring to FIG. 14, at least one speaker utters a voice, and at least one voice signal corresponding to the uttered voice is received by a sound receiver and tracked (Operation 300). At least one sound receiver may output at least one voice signal, and the at least one voice signal may include a mixed voice signal in which one or more voices are mixed.

The mixed voice signal may be classified into voice signals corresponding to the respective speakers, and information corresponding to each voice signal is acquired (Operation 302). In the present case, voice classification (or voice isolation) may be conducted using frequency characteristics of the respective voices, and may also be conducted using the result of analyzing directivities of the respective speakers. In addition, information corresponding to the respective voice signals may include information regarding the utterance position of each speaker.

When the voice is classified into voice signals and the number of classified voice signals corresponding to the number of speakers is acquired, speakers corresponding to the respective classified voice signals may be identified, and identification (ID) information for each speaker may be acquired in response to the identification result (Operation 304).

In accordance with an exemplary embodiment, as soon as each speaker is identified or after each speaker is identified, it is determined whether the classified (or isolated) voice signal is caused by an utterance of the current driver and/or other non-drivers according to the utterance position of the speaker. As described above, the speaker's utterance position may be decided by analyzing directivities of the respective voices. When necessary, information as to whether the isolated voice signal is generated by an utterance of the previous driver may be further decided.

Identification (ID) information may include characteristic information corresponding to a specific voice signal and specific information as to whether the specific voice signal is uttered by the current driver or the previous driver. In accordance with an exemplary embodiment, the identification information may further include information regarding a predetermined identifier or an utterance position.

Figure 15:
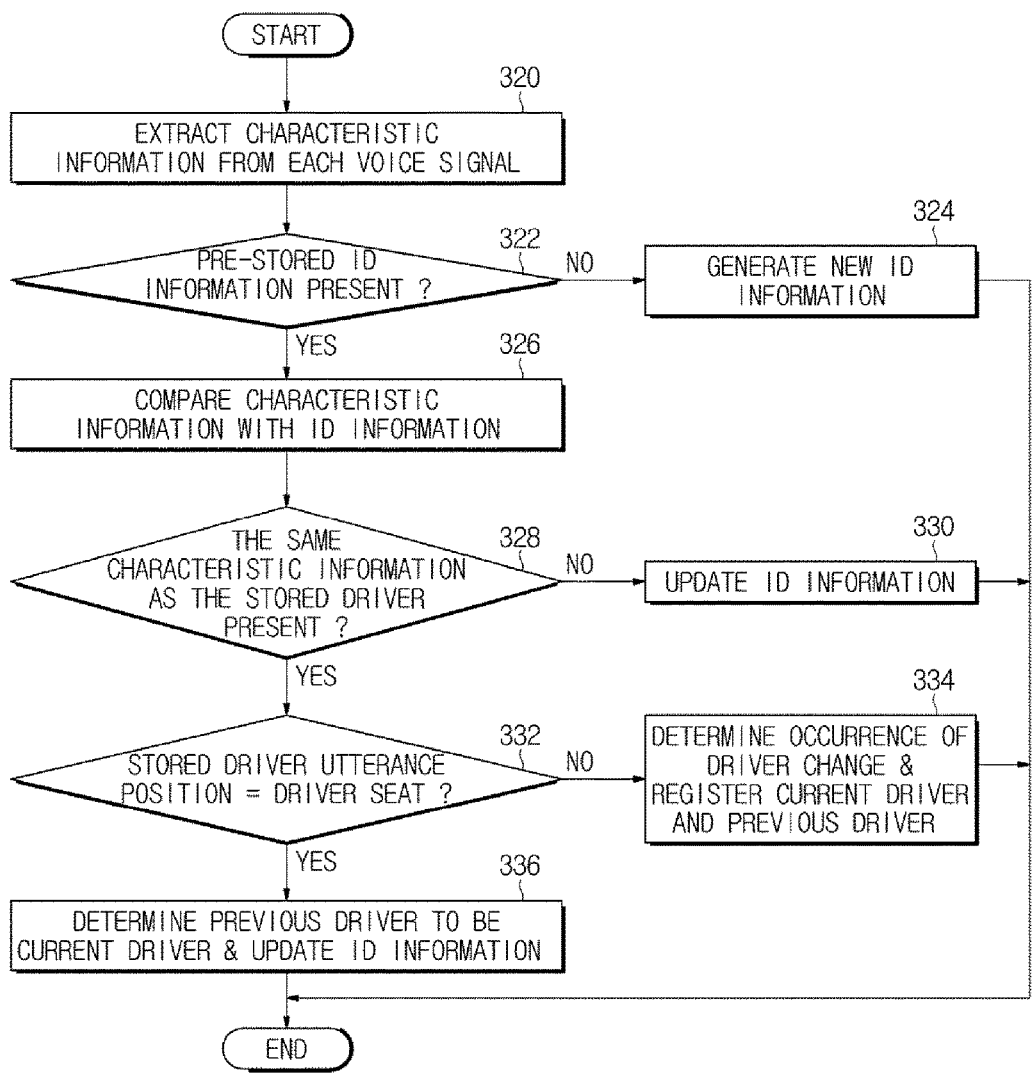
FIG. 15 is a flowchart illustrating a method for identifying a speaker according to an exemplary embodiment of the present invention.

FIG. 15 is a flowchart illustrating a method for identifying a speaker.

Referring to FIG. 15, to identify the speaker as well as to acquire or update the identification information, the characteristic information (e.g., the characteristic vector) may be extracted from each isolated voice signal (Operation 320).

Subsequently, the presence or absence of the pre-stored identification information is decided (Operation 322). when the pre-stored identification information is not present (Operation 322), new identification information is generated (Operation 324). The new identification information may include characteristic information corresponding to each isolated voice signal and information regarding the uttering person on the basis of an utterance position. The utterance information may include specific information as to whether or not the speaker is the current driver.

When the pre-stored identification information is present (Operation 322), each piece of characteristic information acquired from the isolated voice signal is compared with characteristic information included in the pre-stored identification information (Operation 326).

When the same characteristic information as the characteristic information combined with the previous driver information is not detected from the characteristic information acquired from the isolated voice signal (Operation 328), the absence of the same speaker as the previous driver is determined, and identification information may be updated and stored using newly acquired characteristic information (Operation 330). In accordance with an exemplary embodiment, new identification information may be generated using the newly acquired characteristic information. In the present case, the pre-stored identification information may not be deleted from the storage portion.

When the same characteristic information as the characteristic information combined with the previous driver information is not detected from the characteristic information acquired from the isolated voice signal (Operation 328), it is determined whether the utterance position of the speaker corresponding to the same characteristic information as the characteristic information combined with the previous driver information is the driver seat (Operation 322). In other words, it is determined whether the speaker having the same characteristic information as the characteristic information combined with the previous driver information is the driver.

When the utterance position of the speaker is the driver seat (Operation 322), it is determined that the current driver is identical to the previous driver, and identification information may be generated or updated according to the result of determination (Operation 336). In the present case, information as to the uttering person being the previous driver may not be added to the characteristic table used as identification information.

In contrast, when the utterance position of the speaker is not identical to the driver seat positioned (Operation 322), it may be determined that the current driver is different from the previous driver (Operation 334). In other words, it may be determined that the driver has been changed to another driver. In the present case, specific information as to whether the uttering person is the current driver or the previous driver may be added to the characteristic table used as the identification information.

When the speaker is identified and identification information is acquired (Operation 304), the voice signal may be converted into text data such that the voice signal can be processed by the apparatus for selecting the task based on the voice command (Operation 306). The operation for converting the voice signal into text data may be conducted using at least one of a Dynamic Time Warping (DTW) method, Hidden Markov model, and Artificial Neutral Network (ANN).

In accordance with an exemplary embodiment, the operation 304 for converting the voice signal into text data may be conducted before the speaker identification and identification information acquisition process 304, or may be conducted simultaneously with the speaker identification and identification information acquisition process 304.

After the voice signal is converted into the text data, the keyword is extracted from the text-type voice signal (Operation 308), and at least one task may be decided on the basis of the extracted keyword (Operation 310). When at least one task is decided, the processing order of at least one task may be decided according to the decided task (Operation 312).

Figure 16:
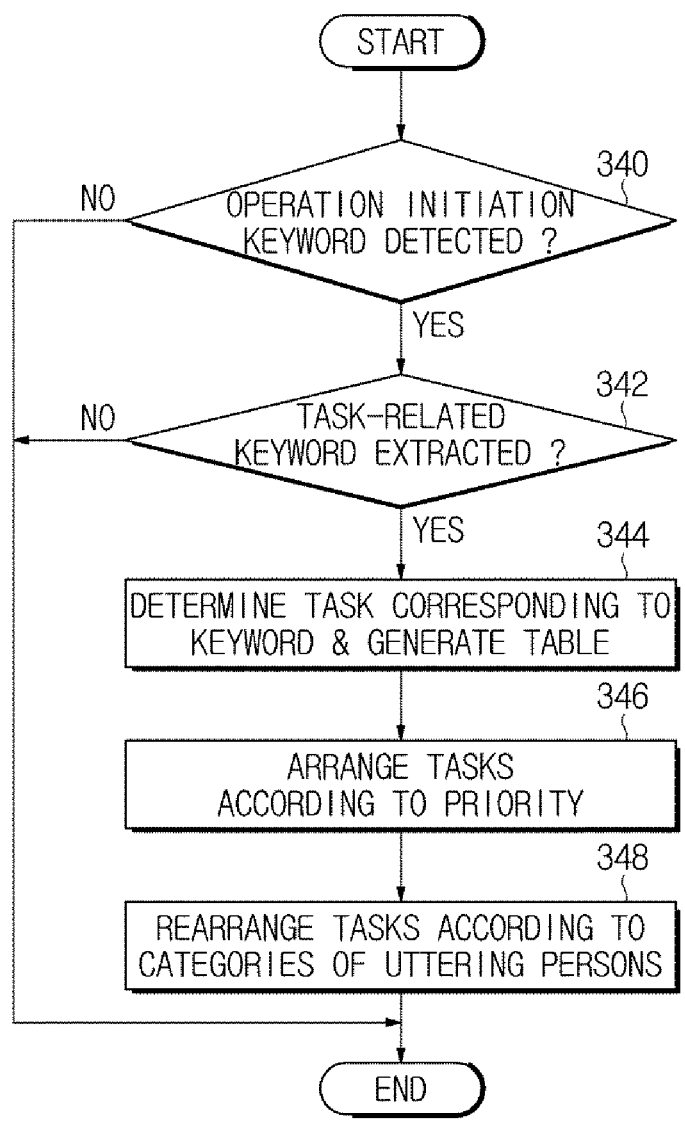
FIG. 16 is a flowchart illustrating a voice analysis, a task corresponding to the voice analysis, and a method for deciding a processing order of the task according to an exemplary embodiment of the present invention.

FIG. 16 is a flowchart illustrating a voice analysis, a task corresponding to the voice analysis, and a method for deciding the processing order of the task.

In more detail, after each isolated voice signal is converted into a text-shaped voice signal, an operation initiation keyword may be found in each text-shaped voice signal (Operation 340). For example, the keyword search may also be conducted using, for example, a predefined keyword DB.

When the operation initiation keyword is detected from a predetermined text-shaped voice signal (Operation 340), it is determined that the voice command has been input, and the keywords related to the task are searched for (Operation 342). The operation for searching for the task-related keywords may also be conducted only in the text-shaped voice signals from which the operation start keyword is detected. The operation for searching for the task-related keyword may be conducted using the voice signal isolated from voice signals acquired after lapse of the operation initiation keyword input time.

When the operation initiation keyword is not found (Operation 340), this signifies that no voice command has been input, wherein the isolated voice signal from which the operation initiation keyword is not found may be discarded immediately or after a lapse of a predefined time period.

The operation for searching for the operation initiation keyword may herein be omitted for convenience of description.

In accordance with an exemplary embodiment, the operation 340 for searching for the operation initiation keyword will herein be omitted for convenience of description.

When the task-related keyword is extracted from the text-shaped voice signal (Operation 342), the task corresponding to the keyword may be decided, and a task table may be generated (Operation 344). An operation for deciding the task corresponding to the keyword may also be conducted using the predefined task DB.

When the task is decided, the processing order of the task may be decided.

For example, the tasks may be sorted in ascending or descending numerical order according to priority values, the at least one task may be sequentially disposed wherein the processing order of the at least one task may be decided (Operation 346).

When necessary, the tasks may also be disposed according to categories of the speakers after sorting of the tasks (Operation 348). In more detail, from among the plurality of tasks, a task corresponding to the keyword extracted from the voice signal based on the utterance of at least one of the current driver and the previous driver from among the plurality of tasks may also be performed prior to the other tasks. In the present case, when the tasks are disposed according to priorities thereof (Operation 346), the position of the task corresponding to the utterance of at least one of the current driver and the previous driver is changed to another according to the predefined setting, and the tasks may be redisposed, wherein the processing order of the tasks may also be changed.

The operation 348 for arranging the tasks according to categories of the speakers may be performed according to priority after sorting of the tasks (Operation 346), or may be performed simultaneously with the operation 346 for sorting the tasks according to priority.

In accordance with an exemplary embodiment, the resultant value may be further determined on the basis of the priority and uttering person categories, the tasks may be disposed using the determination result wherein the processing order of tasks may be decided.

The method for selecting the task based on the voice command according to the exemplary embodiments of the present invention may be applied to a method for controlling a specific device without change, or may be modified and applied to the method for controlling the specific device. For example, the method for selecting the task based on the voice command may also be applied to a method for controlling the vehicle.

When the task and the processing order of the task are decided (Operations 310 and 312), the apparatus for selecting the task based on the voice command may perform the decided task according to the decided task and the processing order of the task, or may generate a control command for an external controlled device, and may transmit the generated control command to the external controlled device (Operation 314).

The above-mentioned method for selecting the task based of the voice command may decide the task and the task processing order according to the priority of each task and information indicating whether the uttering person is the current driver or the previous driver. Therefore, even when voice commands uttered by the plurality of users are input to the apparatus, a relatively high-priority task may be primarily processed.

As is apparent from the above description, the apparatus for selecting at least one task based on a voice command, a vehicle including the same, and ae method thereof according to exemplary embodiments of the present invention may receive voice commands from a plurality of users, may properly select a voice command from among the received commands, and may thus first perform a task corresponding to the selected voice command.

The apparatus for selecting at least one task based on a voice command, the vehicle including the same, and the method thereof according to the exemplary embodiments of the present invention may receive different voice commands from a plurality of users, and may first perform a higher priority task or more urgent task from among tasks corresponding to the plurality of voice commands.

The apparatus for selecting at least one task based on a voice command, the vehicle including the same, and the method thereof according to the exemplary embodiments of the present invention may increase the safety of the vehicle configured for receiving various voice commands, and may improve the convenience of the driver or user who occupies the vehicle.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for selecting a task based on a voice command comprising:
   receiving voices from a plurality of speakers;
   extracting, by a processor, characteristic information from each of the voices of the plurality of sneakers, and acquiring identification information regarding each speaker;
   determining, by the processor, whether the each speaker is a previous driver or a current driver;
   extracting, by the processor, at least one keyword related to a task from each of the voices of the plurality of speakers;
   determining, by the processor, at least one task corresponding to the at least one keyword extracted from each of the voices of the plurality of speakers;
   determining, by the processor, a processing order of the at least one task on a basis of priority information predefined based on whether the each speaker is the previous driver or the current driver; and
   sequentially performing, by the processor, at least one task according to the determined processing order of the at least one task.

2. The method according to claim 1, wherein the determining whether the each speaker is the previous driver or the current driver includes:
   analyzing a directivity of each of the voices of the plurality of speakers, and thus determining an utterance position of the each speaker; and
   determining the current driver on a basis of the utterance position of the each speaker.

3. The method according to claim 2, wherein the determining the processing order of the at least one task on the basis of the predefined priority information includes:
   determining the processing order of the at least one task such that a task corresponding to a keyword extracted from an utterance of the current driver is processed with a relatively high priority.

4. The method according to claim 2, further including:
   generating identification information to further include information regarding the current driver.

5. The method according to claim 1, wherein the determining whether the each speaker is the previous driver or the current driver includes:
   comparing the identification information regarding the each speaker with identification information regarding a pre-stored speaker, and determining whether the speaker is the previous driver.

6. The method according to claim 5, wherein the determining the processing order of the at least one task on the basis of the predefined priority information includes:
   determining a processing order of the at least one task such that a task corresponding to a keyword extracted from an utterance of the previous driver is processed with a relatively high priority.

7. The method according to claim 1, wherein the determining the processing order of the at least one task on the basis of the predefined priority information includes:
- sequentially arranging the at least one task on the basis of the predefined priority information dedicated for the at least one task, and determining a processing order of the at least one task.

8. The method according to claim 7, further including:
- changing a processing order of a task corresponding to a keyword extracted from an utterance of the current driver or the previous driver, from the at least one task being sequentially disposed, to a higher processing order, such that a resultant processing order of the at least one task is determined.

9. The method according to claim 1, wherein the extracting the at least one keyword related to the task from each of the voices of the plurality of speakers includes:
- determining whether an operation initiation keyword is disposed in each of the voices of the plurality of speakers;
- selecting at least one speaker's voice including the operation initiation keyword from the voices of the plurality of speakers; and
- extracting at least one keyword related to a task from the selected voice of the at least one speaker.

10. The method according to claim 1, wherein the extracting the at least one keyword related to the task from each of the voices of the plurality of speakers includes:
- extracting at least one keyword related to the task from each of the voices of the plurality of speakers on a basis of priority predefined for each of the at least one task.

11. A vehicle comprising:
- a sound receiver configured to receive voices from a plurality of speakers;
- a processor configured to analyze each of the voices of the plurality of speakers, extract at least one keyword related to an operation of a vehicle from each of the voices of the plurality of speakers, determine at least one task corresponding to at least one keyword extracted from each of the voices of the plurality of speakers, determine a processing order of the at least one task on a basis of predefined priority information determined based on whether each speaker is a previous driver or a current driver, and sequentially generate a control signal according to the determined processing order of the at least one task; and
- a peripheral device configured to operate according to the control signal,
- wherein the processor is configured to extract characteristic information from each of the voices of the plurality of speakers, acquires identification information regarding each speaker and determines whether the each speaker is the previous driver or the current driver.

12. The vehicle according to claim 11, wherein the processor is configured to analyze the directivity of each of the voices of the plurality of speakers to determine an utterance position of the each speaker, and is configured to determine the current driver on a basis of the utterance position of the each speaker.

13. The vehicle according to claim 12, wherein the processor is configured to determine the processing order of the at least one task such that a task corresponding to a keyword extracted from an utterance of the current driver is processed with a relatively high priority, such that the processing order of the at least one task is determined on the basis of the predefined priority information.

14. The vehicle according to claim 11, wherein the processor is configured to compare identification information regarding the speaker with identification information regarding a pre-stored speaker, and is configured to determine whether the speaker is the previous driver.

15. The vehicle according to claim 14, wherein the processor is configured to determine a processing order of the at least one task such that a task corresponding to a keyword extracted from the utterance of the previous driver is processed with a relatively high priority, wherein the processing order of the at least one task is determined on a basis of the predefined priority information.

16. The vehicle according to claim 11, wherein the processor is configured to sequentially arrange the at least one task on the basis of the predefined priority information dedicated for the at least one task, and is configured to determine a processing order of the at least one task.

17. The vehicle according to claim 16, wherein the processor is configured to change a processing order of a task corresponding to a keyword extracted from an utterance of the current driver or the previous driver, from the at least one task being sequentially disposed, to a higher processing order, wherein a resultant processing order of the at least one task is determined.

18. The vehicle according to claim 11, wherein the processor is configured to determine whether an operation initiation keyword is disposed in each of the voices of the plurality of speakers, selects at least one speaker's voice including the operation initiation keyword from the voices of the plurality of speakers, and extracts at least one keyword related to a task from the selected voice of the at least one speaker.

19. The vehicle according to claim 11, wherein the processor is configured to analyze each of the voices of the plurality of speakers on a basis of priority predefined for each of the at least one task.

20. An apparatus for selecting a task based on a voice command comprising:
- a sound receiver configured to receive voices from a plurality of speakers; and
- a processor configured to analyze each of the voices of the plurality of speakers, extract at least one keyword related to an operation of a vehicle from each of the voices of the plurality of speakers, determine at least one task corresponding to at least one keyword extracted from each of the voices of the plurality of speakers, and determine a processing order of the at least one task on a basis of a predefined priority information determined based on whether the each speaker is a previous driver or a current driver,
- wherein the processor is configured to extract characteristic information from each of the voices of the plurality of speakers, acquires identification information regarding each speaker and determines whether the each speaker is the previous driver or the current driver.

* * * * *